United States Patent
Ogawa et al.

(10) Patent No.: US 7,784,307 B2
(45) Date of Patent: Aug. 31, 2010

(54) OPTICAL MEMBER MADE OF SYNTHETIC QUARTZ GLASS, AND PROCESS FOR ITS PRODUCTION

(75) Inventors: Tomonori Ogawa, Yokohama (JP); Yoshiaki Ikuta, Yokohama (JP); Shinya Kikugawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 186 days.

(21) Appl. No.: 11/540,760

(22) Filed: Oct. 2, 2006

(65) Prior Publication Data
US 2007/0027018 A1    Feb. 1, 2007

Related U.S. Application Data

(63) Continuation of application No. PCT/JP2005/007281, filed on Apr. 8, 2005.

(30) Foreign Application Priority Data

Apr. 28, 2004    (JP)    ............................. 2004-133199

(51) Int. Cl.
  *C03B 19/00*    (2006.01)
  *C03B 19/06*    (2006.01)
  *C03C 3/04*    (2006.01)
  *C03C 3/06*    (2006.01)
(52) U.S. Cl. ........................... 65/17.6; 65/17.4; 501/53; 501/54
(58) Field of Classification Search ................... 501/53, 501/54; 65/17.4, 17.6; 250/492.1
See application file for complete search history.

(56) References Cited

U.S. PATENT DOCUMENTS 5,364,433 A * 11/1994 Nishimura et al. ........... 65/17.4
5,523,266 A *  6/1996 Nishimura et al. ............ 501/54

(Continued)

FOREIGN PATENT DOCUMENTS

EP    1 088 795    4/2001

(Continued)

OTHER PUBLICATIONS

Van Peski, International SEMATECH Technical Report #00073974A-TR, 2000, International SEMATECH.

(Continued)

*Primary Examiner*—Karl E Group
*Assistant Examiner*—Noah S Wiese
(74) *Attorney, Agent, or Firm*—Oblon, Spivak, McClelland, Maier & Neustadt, L.L.P.

(57)    ABSTRACT

To reduce the change in the refractive index of an irradiated portion of synthetic quartz glass, caused by the irradiation with a high energy light emitted from a light source such as a KrF excimer laser or an ArF excimer laser. A process for producing an optical member made of synthetic quartz glass, wherein the OH group concentration of the optical member is set depending upon the energy density of the laser beam employed, to adjust the ratio R $(KJ/cm^2\text{-ppb})^{-1}$ of the change in the refractive index of the optical member to the cumulative irradiation energy $(KJ/cm^2)$ by the laser, to be $0.1 \leq R \cdot I_{toreq} \leq 0.2$, thereby to control the change in the refractive index of the optical member made of synthetic quartz glass by the irradiation with a laser beam to be within a predetermined range.

14 Claims, 1 Drawing Sheet

U.S. PATENT DOCUMENTS

| | | | |
|---|---|---|---|
| 6,143,676 A * | 11/2000 | Ohashi et al. | 501/54 |
| 6,376,401 B1 * | 4/2002 | Kondo et al. | 501/54 |
| 6,689,705 B2 * | 2/2004 | Fujinoki et al. | 501/54 |
| 6,754,002 B2 * | 6/2004 | Borrelli et al. | 359/355 |
| 7,368,403 B2 * | 5/2008 | Ikuta et al. | 501/54 |
| 2002/0061810 A1 * | 5/2002 | Urano et al. | 501/54 |
| 2006/0183623 A1 * | 8/2006 | Ikuta et al. | 501/54 |

FOREIGN PATENT DOCUMENTS

| | | |
|---|---|---|
| EP | 1 152 237 | 11/2001 |
| JP | 4-97922 | 3/1992 |
| JP | 8-26758 | 1/1996 |
| JP | 2000-191329 | 7/2000 |
| JP | 2001 146434 | 5/2001 |
| JP | 2001-302274 | 10/2001 |
| WO | WO 03/091175 * | 6/2003 |

OTHER PUBLICATIONS

Van Peski et al, Journal of Non-Crystalline Solids, 2000, vol. 265, pp. 285-289.

* cited by examiner

OPTICAL MEMBER MADE OF SYNTHETIC QUARTZ GLASS, AND PROCESS FOR ITS PRODUCTION

TECHNICAL FIELD

The present invention relates to an optical member made of synthetic quartz glass to be used as a material for an optical component excellent in the homogeneity of refractive index and having a small birefringence and a small change in the refractive index when used by an excimer laser, particularly by an ArF excimer laser, such as a lens, a prism, a photomask or a material for windows, to be used in an optical device employing a KrF excimer laser (wavelength: 248 nm), an ArF excimer laser (wavelength: 193 nm) or the like as a light source.

BACKGROUND ART

Heretofore, in a photolithographic technology, an exposure apparatus has been widely utilized which transfers a fine circuit pattern on a wafer to produce an integrated circuit. Along with high integration and high functionality of an integrated circuit, an integrated circuit becomes finer, and an exposure apparatus is required to form an image of a circuit pattern with high resolution on a wafer with a long focal depth, and shortening of the wavelength of the exposure light source is being advanced. The exposure light source has been advanced from conventional g-line (wavelength: 436 nm) or i-line (wavelength: 365 nm), and now, a KrF excimer laser (wavelength: 248 nm) or an ArF excimer laser (wavelength: 193 nm) is being used. Further, in recent years, use of an ArF excimer laser (wavelength: 193 nm) employing a liquid immersion technique has been under study.

The optical member to be used for an optical device employing such a light source, is required to be such that:

(1) the refractive index distribution An in an ultraviolet region is small, (2) the change in absolute refractive index (compaction or rarefaction) by ultraviolet irradiation is small, i.e. the ultraviolet durability is high, and (3) the birefringence is small.

Conventional synthetic quartz glass is known to undergo a phenomenon so-called compaction or rarefaction when irradiated with a high energy beam emitted from a light source such as a KrF excimer laser or an ArF excimer laser.

Compaction is a phenomenon wherein by the ultraviolet irradiation, the density of the irradiated portion of synthetic quartz glass increases, and along with this change in the density, the refractive index of the irradiated portion of synthetic quartz glass increases. On the other hand, rarefaction is a phenomenon wherein by the ultraviolet irradiation, the density of the irradiated portion of synthetic quartz glass decreases, and along with this change in the density, the refractive index of the irradiated portion of synthetic quartz glass decreases.

Which one of the phenomena i.e. compaction or rarefaction takes place, depends on the type of synthetic quartz glass and irradiation conditions (energy density and cumulative irradiation energy), and the phenomenon is complex.

Further, with synthetic quartz glass of the same composition, as the pulse energy density of irradiated light is high, the synthetic quartz glass tends to show compaction, and as the pulse energy density is low, the synthetic quartz glass usually tends to show rarefaction (Chris Van Peski, "Behavior of Fused Silica Under 193 nm Irradiation", International SEMATECH Technical Report#00073974A-TR, (U.S.A.), International SEMATECH, Jul. 25, 2000).

In a semiconductor exposure device, a fine pattern on a photomask will be reduced and projected on a wafer. Accordingly, a projector lens is required to have an extremely high homogeneity of refractive index. If the refractive index of the projector lens is entirely or locally changed by ultraviolet irradiation, such a change presents an adverse effect such that the focal position becomes out of alignment, whereby the desired reduced projection of a pattern will be impossible.

Further, if the density of the irradiated portion of synthetic quartz glass is changed by ultraviolet irradiation, a stress will be induced at the irradiated portion and its vicinity, whereby the birefringence of synthetic quartz glass will be changed. This change in the birefringence will also have an adverse effect on the image forming performance of the projector lens, and thus is problematic.

The cause for the change in the density of synthetic quartz glass due to ultraviolet irradiation, has not yet clearly been understood, but some methods for improvement have been proposed.

For example, a method for producing synthetic quartz glass having a small degree of compaction, has been proposed (JP-A-2000-191329). The production method disclosed in this publication comprises heat treating in an oxidizing atmosphere a porous quartz glass body prepared by a VAD method, followed by transparent vitrification, and then heat treating in a hydrogen gas-containing atmosphere the transparent vitrified synthetic quartz glass block, to dope hydrogen molecules into the quartz glass.

The synthetic quartz glass obtained by this method contains no oxygen deficient type defects (≡Si-Si≡) and the degree of compaction by ultraviolet irradiation is small. By this method, it is possible to obtain synthetic quartz glass excellent in compaction without impairing other properties such as the homogeneity of refractive index. However, even the synthetic quartz glass produced by this method may sometimes shows rarefaction depending upon the irradiation conditions of ultraviolet lights, whereby the change in the refractive index of synthetic quartz glass will be large. Thus, the change in the refractive index of the synthetic quartz glass by ultraviolet irradiation has not yet been necessarily satisfactory.

DISCLOSURE OF THE INVENTION

The present invention has been made to solve the above problems, and it is an object of the present invention to provide synthetic quartz glass which is suitable for ultraviolet lights, particularly for an ArF excimer laser (193 nm) and which has a small change in the refractive index and small birefringence and is excellent in the refractive index distribution, and a process for its production.

Firstly, the present invention provides a process for producing an optical member made of synthetic quartz glass to be used in an optical device employing an ArF excimer laser beam or a KrF excimer laser beam as a light source at a prescribed energy density, which comprises a step of setting the OH group concentration of the optical member depending upon the energy density of the laser beam employed, to adjust the ratio $R$ $(KJ/cm^2 \cdot ppb)^{-1}$ of the change in the refractive index of the optical member to the cumulative irradiation energy $(KJ/cm^2)$ by the laser, to be $0 \leq R \leq 0.2$.

Secondly, the present invention provides an optical member made of synthetic quartz glass to be used in an optical device employing an ArF excimer laser beam or a KrF excimer laser beam having an energy density of from 10 to 500

μJ/cm²/pulse, as a light source, wherein the synthetic quartz glass has an OH group concentration of from 10 to 60 ppm and a halogen concentration of at most 50 ppm, and the ratio R (KJ/cm²·ppb)$^{-1}$ of the change in the refractive index of the optical member to the cumulative irradiation energy (KJ/cm²) by the laser at the energy density of 200 μJ/cm²/pulse, satisfies $0 \leq R \leq 0.2$.

Thirdly, the present invention provides such an optical member made of synthetic quartz glass, wherein in the optical member, the OH group concentration is at most 60 ppm, the birefringence is at most 0.8 nm/cm at a wavelength of 633 nm, and the refractive index distribution is at most $1.5 \times 10^{-6}$ at a wavelength of 633 nm.

According to the present invention, it is possible to obtain synthetic quartz glass which is suitable for an optical member for a projection aligner, particularly for an optical member of a projection system and which is excellent in the homogeneity of refractive index and whereby the birefringence is small, and the change in refractive index is small, i.e. which is excellent in ultraviolet durability.

BEST MODE FOR CARRYING OUT THE INVENTION

Figure 1:
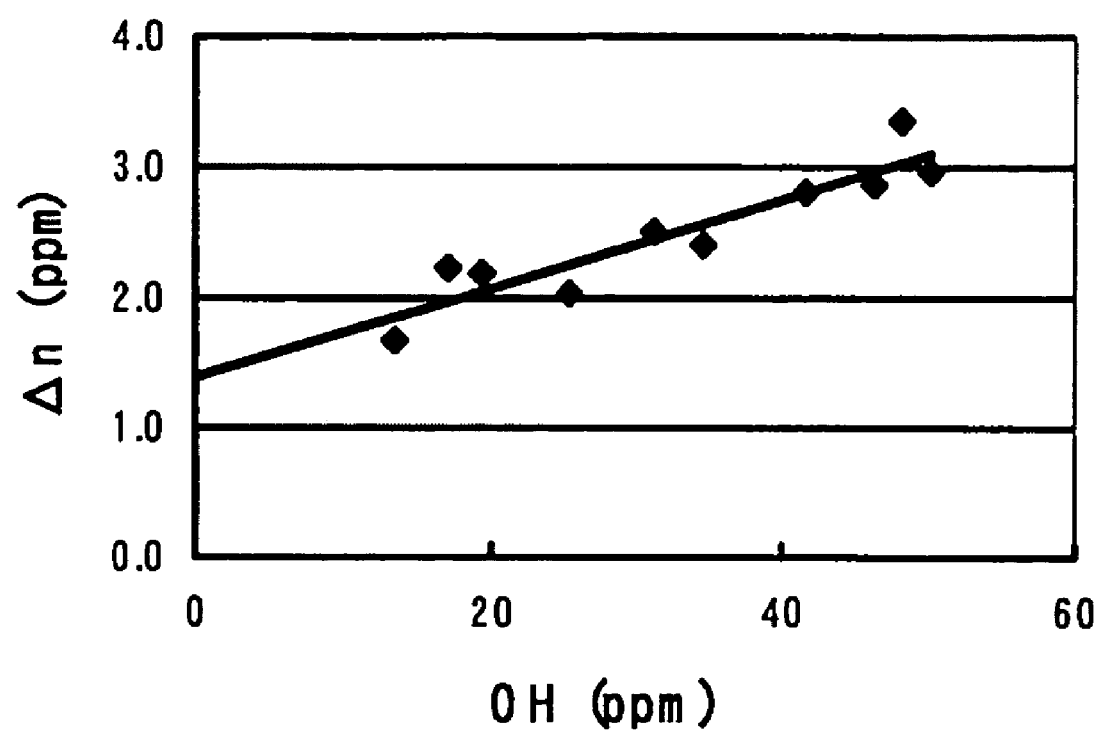
FIG. 1 shows a relation between the change in the refractive index of synthetic quartz glass by laser irradiation and the OH group concentration.

The present inventors have conducted an extensive study about the OH group concentration in synthetic quartz glass and the manner of the change in refractive index for the purpose of reducing the change in refractive index of synthetic quartz glass when irradiated with ultraviolet lights, in order to obtain synthetic quartz glass having the above-mentioned effects. As a result, it has been found that when synthetic quartz glass is irradiated with a prescribed laser beam, a positive interrelation exists between the change in the refractive index of the synthetic quartz glass by laser beam irradiation and the OH group concentration in the synthetic quartz glass, as shown in FIG. 1.

Namely, it has been found that as the OH group concentration in the synthetic quartz glass decreases, the change in the refractive index of the synthetic quartz glass by irradiation also decreases. Here, the conditions for irradiation with the laser beam are such that the frequency is 2 KHz, the energy density is 10 mJ/cm²/pulse, and the number of irradiation times is $25 \times 10^6$ times.

Further, from the above results, it is considered that there is a certain relation between the OH group concentration in the synthetic quartz glass and the ratio R (KJ/cm²·ppb)$^{-1}$ of the change in the refractive index of the synthetic quartz glass to the cumulative irradiation energy (KJ/cm²) by the laser beam, and in the case of synthetic quartz glass having a small halogen content, the OH group concentration is the main factor for the change in refractive index by laser irradiation.

The present invention is directed to an optical member made of synthetic quartz glass and a process for its production, wherein the OH content in the synthetic quartz glass is set depending upon the energy density of the laser beam to be employed, to stabilize the change in the refractive index under the practical conditions.

A specific process for producing an optical member made of synthetic quartz glass will be described below. Firstly, a calibration curve is prepared which shows the relation between the change in the refractive index after irradiation of a prescribed cumulative irradiation energy (KJ/cm²) at the energy density of a laser beam supposed to be used for an optical device, and the OH group concentration in the synthetic quartz glass.

Then, from the prepared calibration curve and the range of the energy density of the laser beam to be actually used, the OH group concentration at which the change in refractive index is expected to be minimum, will be decided. To bring the synthetic quartz glass to the determined OH group concentration, the treating temperature and the treating time may be adjusted at the time of treating the porous synthetic quartz glass body. Further, as a method for adjusting the OH concentration, there may, for example, be a method of treating the porous quartz glass body in a dried high temperature gas.

In the present invention, the practical condition means an energy density of from 10 to 500 μJ/cm²/pulse in the case of the ArF excimer laser (193.6 nm).

In the present invention, the OH group concentration in the synthetic quartz glass is preferably from 10 ppm to 60 ppm, more preferably from 10 to 30 ppm when used, for example, at an energy density of 200 μJ/cm²/pulse. The synthetic quartz glass having such an OH group concentration may substantially be used also at an energy density of from 10 to 500 μJ/cm²/pulse.

The OH group concentration is measured by an infrared spectrophotometer in accordance with a literature (Cer. Bull., 55(5), 524, (1976)). The detection limit in this measurement is 1 ppm.

The birefringence is preferably at most 0.8 nm/cm, more preferably at most 0.5 nm/cm at a wavelength of 633 nm. Namely, as the material for an optical component of a projection system, a low birefringence is required.

The birefringence is measured at a region of 320 mm in diameter from the center of a sample by an automatic birefringence measuring apparatus (ABR-10A-40A) manufactured by Uniopt Corporation, Ltd., after maintaining a synthetic quartz glass sample of 360 mm in diameter in an atmosphere of 23° C. for at least 3 hours.

The refractive index distribution is preferably at most $1.5 \times 10^{-6}$, more preferably at most $1.0 \times 10^{-6}$, at a wavelength of 633 nm.

The refractive index distribution is measured at an area of 320 mm in diameter from the center of a sample by PHOM measurement by means of Fizeau interferometer (Mark-IV) manufactured by Zygo KK wherein a synthetic quartz glass sample of 360 mm in diameter is polished by imparting wedge 6' on two sides in the optical axis direction.

The absolute refractive index is measured by a minimum angle of deviation method by means of a goniometer spectrometer 1 model UV-VIS-IR, manufactured by MOLLER-WEDEL Company. The measurement is carried out in a nitrogen gas atmosphere of 1013.25 hPa, and the temperature for the measurement is 23° C. Using refractive indices at eleven wavelengths from 633 nm to 185 nm, constants in the dispersion formula $(n^2 = A_0 + A_1\lambda^2 + A_2\lambda^{-2} + A_3\lambda^{-4} + A_4\lambda^{-6} + A_5\lambda^{-8} + A_6\lambda^{-10})$ are determined by the least-squares method, and by this dispersion formula, the refractive index at 193 nm is obtained.

The halogen concentration in the synthetic quartz glass is preferably at most 50 ppm, more preferably at most 10 ppm. Particularly preferably, it contains substantially no halogen. It is thereby possible to suppress the decrease in the transmittance and the change in the refractive index by the ultraviolet irradiation to sufficiently low levels.

The measurement of the chlorine concentration in the synthetic quartz glass can be carried out by a fluorescent X-ray analysis. The detection limit in this measurement is 10 ppm.

Further, the synthetic quartz glass of the present invention preferably contains hydrogen molecules within a range of from $5 \times 10^{15}$ molecules/cm3 to $1 \times 10^{17}$ molecules/cm$^3$. Hydrogen molecules in the synthetic quartz glass have a function to repair paramagnetic defects such as E' centers formed by ultraviolet irradiation or non-crosslinked oxygen radicals and thus have an effect to suppress the decrease in the transmittance by ultraviolet irradiation.

In the present invention, metal impurities such as alkali metals (such as Na, K and Li), alkaline earth metals (such as Mg and Ca) and transition metals (Fe, Ni, Cr, Cu, Mo, W, Al, Ti and Ce) in the synthetic quartz glass, not only deteriorate the light transmittance from the ultraviolet region to the vacuum ultraviolet region, but also cause to deteriorate light durability. Accordingly, their content is preferably as small as possible. Specifically, the total content of such metal impurities is preferably at most 100 ppb, particularly preferably at most 50 ppb.

Now, the process for producing the synthetic quartz glass of the present invention will be described. The process for preparing the synthetic quartz glass is one which comprises supplying, as the raw materials, a compound containing Si, oxygen gas, hydrogen gas, nitrogen gas, etc. to a burner for producing quartz glass thereby to let the raw materials undergo a hydrolytic reaction or/and an oxidation reaction in oxyhydrogen flame to prepare quartz glass, and it includes two types i.e. a direct method and a soot method (a VAD method, an OVD method or an indirect method).

The direct method is a preparation method for directly preparing transparent synthetic quartz glass by subjecting a compound containing Si to flame hydrolysis at a temperature of from 1,500 to 2,000° C. to prepare $SiO_2$ particles, which are deposited and fused on a substrate.

On the other hand, the VAD method is a method wherein a compound containing Si is subjected to flame hydrolysis at a temperature of from 1,000 to 1,500° C. to prepare $SiO_2$ particles, which are deposited on a substrate to obtain a porous synthetic quartz glass body, which is then heated to a temperature of from 1,400 to 1,500° C. to densify the porous synthetic quartz glass body thereby to obtain a transparent synthetic quartz glass body.

As the method for preparing synthetic quartz glass, the VAD method is preferred from such a viewpoint that the reaction temperature for the preparation is relatively low, and the composition and the defect concentration can relatively freely be controlled. Especially, the reaction temperature for the preparation is low, and accordingly, when a raw material containing chlorine, such as $SiCl_4$, is used for the preparation, the chlorine concentration in synthetic quartz glass is low by the VAD method as compared with the direct method, and also from this viewpoint, the VAD method is preferred.

Further, the raw materials for synthetic quartz glass are not particularly limited so long as they are materials which can be gasified. For example, a halogenated silicon compound, such as a chloride such as $SiCl_4$, $SiHCl_3$, $SiH_2Cl_2$ or $SiCH_3Cl_3$, or a fluoride such as $SiF_4$, $SiHF_3$ or $SiH_2F_2$, or a silicon compound containing no halogen, such as an alkoxy silane represented by $RnSi(OR)_{4-n}$ (wherein R is a $C_{1-4}$ alkyl group, and n is an integer of from 0 to 3), or $(CH_3)_3Si$—O—$Si(CH_3)_3$, may be mentioned.

If a chloride is used as the raw material, chlorine in the raw material will remain to some extent in the synthetic quartz glass. Accordingly, as the raw material, an organic silicon compound containing no chlorine, or a fluoride is preferred. However, if a fluoride is used as the raw material, at the time of preparation, hydrofluoric acid (HF) will be formed as a byproduct, which will be problematic from the viewpoint of the safety and handling efficiency. Accordingly, as the raw material, an organic silicon compound containing no halogen is more preferred.

As the above-mentioned substrate, a seed rod made of quartz glass (for example, a seed rod disclosed in JP-B-63-24973) may be used. Further, not only a substrate of a rod shape, but also a substrate of a plate shape may be employed.

After obtaining a porous quartz glass body, the porous quartz glass body is heated to a transparent vitrification temperature for transparent vitrification to obtain quartz glass. The transparent vitrification temperature is usually from 1,300 to 1,600° C., particularly preferably from 1,350 to 1,500° C. As the atmosphere, an atmosphere of 100% inert gas such as helium, or an atmosphere containing an inert gas such as helium as the main component, is preferred. The pressure may be reduced pressure or normal pressure. Especially in the case of normal pressure, helium gas may be employed. Further, in the case of reduced pressure, at most 133 Pa is preferred. Here, in this specification, "Pa" means the absolute pressure i.e. not a gauge pressure.

Further, under the reduced pressure, OH group-reducing treatment and transparent vitrification treatment can be carried out simultaneously. In this case, under the reduced pressure, the temperature is maintained at a level of from 1,200 to 1,350° C. for from 20 to 70 hours to reduce OH groups and then raised to 1,350 to 1,500° C. to carry out transparent vitrification. The OH group concentration is adjusted by the treating time and the treating temperature to a level of from 10 to 60 ppm. At the same treating temperature, as the treating time is long, the OH group concentration will be reduced. If the treating temperature is too low, a dehydration reaction will not take place in glass, and if it is too high, sintering takes place for densification, whereby moisture in glass tends to be hardly released to the exterior. Accordingly, the treating temperature is preferably within a range of from 1,000 to 1,350° C.

The quartz glass body thus obtained, is heated to a temperature of at least the softening point and formed into a desired shape to obtain a shaped quarts glass body. The temperature range for the forming processing is preferably from 1,650° C. to 1,800° C. If it is lower than 1,650° C., the viscosity of the quartz glass will be high, whereby substantially no shaping by its own weight takes place, or growth of cristobalite as a crystalline phase of $SiO_2$ tends to occur whereby so-called devitrification may result. On the other hand, if it exceeds 1,800° C., sublimation of $SiO_2$ may no longer be ignored. The direction in which the glass body is permitted to undergo shaping by its own weight is preferably the same as the direction of the growth of the porous quartz glass body.

Then, the obtained quartz shaped glass body is heated under normal pressure or under reduced pressure to a temperature of at least annealing point i.e. from about 1,100° C. to 1,250° C., held for a prescribed time, and then, annealed in the temperature region in the vicinity of the annealing point at a prescribed cooling rate thereby to reduce the birefringence and to obtain a quartz glass ingot having high homogeneity. The cooling rate is usually preferably within a range of from 0.25 to 5° C./hr, although it depends also on the size of the quartz glass body. If it exceeds 5° C./hr, a strain may not sufficiently be removed, and it tends to be difficult to attain birefringence=0.5 nm/cm i.e. the object of the present invention. The annealing point of quartz is generally 1,100° C., and the temperature range for cooling at a rate of from 0.25 to 5° C./hr is suitably from 1,250° C. to 500° C.

Then, the obtained quartz shaped glass body is held in a hydrogen atmosphere to obtain a hydrogen-doped optical synthetic quartz glass. This treatment is preferably carried out at a temperature of at most 600° C. Namely, by carrying out hydrogen treatment at a low temperature, formation of reduction type defects can be prevented. The pressure is usually from 1 to 30 atm. As the hydrogen atmosphere, an inert gas atmosphere containing from 0.1 to 100 vol % of hydrogen gas, is preferred.

The synthetic quartz glass body obtained via the above steps is typically such that the Cl content is at most 10 ppm, the OH content is from 10 to 60 ppm, the total amount of heavy metals and alkali metals is at most 10 ppb, the fictive temperature is at least 1,000° C. and at most 1,100° C., the birefringence is at most 0.8 nm/cm, and the refractive index distribution is at most $1.5 \times 10^{-6}$ at an area of 320 mm in diameter from the center of a sample of 360 mm in diameter and 80 mm in thickness.

EXAMPLE

Now, the present invention will be described in further detail with reference to an Example, but it should be understood that the present invention is by no means restricted to such a specific Example.

A porous quartz glass body having a diameter of 400 mm and a thickness of 800 mm, is obtained by a VAD method employing $SiCl_4$ as the raw material. Then, the porous glass body is heated to 1,250° C. at a temperature-raising rate of 500° C./hr under a reduced pressure of at most 133 Pa, and then held at 1,250° C. for 48 hours to reduce the OH group concentration, whereupon it is heated to 1,450° C. and held at this temperature for 2 hours to obtain a transparent glass body having a diameter of 240 mm and a thickness of 450 mm.

Further, the obtained transparent quartz glass body is placed in a carbon mold form having a diameter of 400 mm and heated to 1,750° C. in an atmosphere of 100% argon gas with 101 kPa thereby to obtain a quartz shaped glass body having a diameter of 400 mm.

Then, to prevent diffusion of impurities from the peripheral portion, the side surfaces and the top and bottom surfaces of the quartz shaped glass body are ground 20 mm. Then, the quartz shaped glass body is placed in an electric furnace, heated to 1,250° C. after the pressure is reduced to at most 133 Pa, held at this temperature for 24 hours, then annealed at a cooling rate of 0.25° C./hr to 500° C. and left to cool by stopping the power supply to the electric furnace at 500° C.

Further, it is ground until the diameter becomes 360 mm and the thickness becomes 80 mm, and then held at 500° C. for 450 hours under a pressure of 101 kPa in an atmosphere containing 20 vol % of hydrogen to carry out hydrogen doping into the quartz glass.

With respect to the synthetic quartz block thus obtained, the various physical properties are measured, and the results of measurements are shown in Table 1. For the measurement of the respective physical properties, the above-mentioned methods are employed.

TABLE 1

| Items measured | Results of measurements |
| --- | --- |
| OH contents | 22 ppm |
| Birefringence | 0.45 nm/cm |
| Refractive index distribution | $1.2 \times 10^{-6}$ |

In a case where this sample is irradiated with a laser beam having an energy density of 200 μJ/cm²/pulse until the cumulative irradiation energy becomes 8,000 KJ/cm², the ratio R (KJ/cm²·ppb)$^{-1}$ of the change in the refractive index of the optical member to the cumulative irradiation energy (KJ/cm²) becomes at a level of $7 \times 10^{-2}$, and thus, it is possible to bring the change in the refractive index by laser irradiation to a level within the prescribed range.

The entire disclosure of Japanese Patent Application No. 2004-133199 filed on Apr. 28, 2004 including specification, claims, drawing and summary is incorporated herein by reference in its entirety.

What is claimed is:

1. A process for producing an optical member made of synthetic quartz glass to be used in an optical device employing an ArF excimer laser beam or a KrF excimer laser beam as a light source at a prescribed energy density, which comprises setting the OH group concentration of the optical member depending upon the energy density of the laser beam employed, to adjust the ratio R (KJ/cm²·ppb)$^{-1}$ of the change in the refractive index of the optical member to the cumulative irradiation energy (KJ/cm²) by the laser, to be $0 \leq R \leq 0.2$,
wherein the synthetic quartz glass having the set OH group concentration is obtained from a porous quartz glass body which has been simultaneously subjected to OH group-reducing treatment and transparent vitrification treatment under a reduced pressure while maintaining the temperature at a level of from 1,200 to 1,350° C. for at least 20 hours to reduce OH groups and then raised to 1,350 to 1,500° C. to carry out transparent vitrification, and wherein the OH group concentration is adjusted by the treating time and the treating temperature to a level of from 10 to 60 ppm, and then the synthetic quartz glass is held in a hydrogen atmosphere at a temperature of at most 600° C. to obtain a hydrogen-doped optical synthetic quartz glass.

2. The process of claim 1, wherein the synthetic quartz glass contains hydrogen molecules within a range of from $5 \times 10^{15}$ to $1 \times 10^{17}$ molecules/cm³.

3. The process of claim 1, wherein the synthetic quartz glass has an OH group concentration of from 10 to 30 ppm.

4. The process of claim 1, wherein the synthetic quartz glass has a birefringence of at most 0.8 nm/cm at a wavelength of 633 nm.

5. The process of claim 1, wherein the synthetic quartz glass has a birefringence of at most 0.5 nm/cm at a wavelength of 633 nm.

6. The process of claim 1, wherein in the optical member, the refractive index distribution is at most $1.5 \times 10^{-6}$ at a wavelength of 633 nm.

7. The process of claim 1, wherein in the optical member, the refractive index distribution is at most $1.0 \times 10^{-6}$ at a wavelength of 633 nm.

8. The process of claim 1, wherein the synthetic quartz glass has a halogen concentration of at most 50 ppm.

9. The process of claim 1, wherein the synthetic quartz glass has a halogen concentration of at most 10 ppm.

10. The process of claim 1, wherein the synthetic quartz glass contains substantially no halogen.

11. The process of claim 1, wherein the synthetic quartz glass has a total content of alkali metals, alkaline earth metals and transition metals of at most 100 ppb.

12. The process of claim 1, wherein the synthetic quartz glass has a total content of alkali metals, alkaline earth metals and transition metals of at most 50 ppb.

13. The process of claim 1, wherein the pressure in the hydrogen atmosphere is from 1 to 30 atm.

14. The process of claim 1, wherein the hydrogen atmosphere is an inert gas atmosphere containing from 0.1 to 100 vol % of hydrogen gas.

* * * * *